Patented Jan. 22, 1935

1,988,834

UNITED STATES PATENT OFFICE 1,988,834

PROCESS FOR BREAKING PETROLEUM EMULSIONS

Melvin De Groote, St. Louis, Mo., assignor to Tretolite Company, Webster Groves, Mo., a corporation of Missouri No Drawing. Application March 15, 1934
Serial No. 715,771

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type to the action of a treating agent or demulsifying agent of a particular composition hereinafter described, thereby causing the emulsion to break down and separate into its component parts of oil and water or brine, when the emulsion is permitted to remain in a quiescent state after such treatment.

The treating agent or demulsifying agent used in my process is composed of a mixture in molecular proportions, of certain substances, compounds, or materials. One component of said mixture consists of a water-soluble sulfo compound or compounds, such as a sulfonate or sulfonates, a fatty acid sulfate salt or sulfate salts, etc., and said component, whether it consists of a single material or a combination of materials, is characterized by the fact that it does not precipitate in the presence of water-soluble calcium salts or water-soluble magnesium salts, commonly referred to as "alkaline earth salts." The other component of said mixture consists of a water-soluble demulsifying agent or agents of the type which are well known to possess water-softening properties. Said components must be of such a nature or character that when they are combined, they will produce a demulsifying agent which is characterized by the fact that it precipitates in its entirety when contacted with water-soluble calcium salts or water-soluble magnesium salts.

The individual components of the demulsifying agent contemplated by my process have been used separately and individually as such for breaking oil field emulsions. It is also possible that demulsifying agents have heretofore been prepared from mixtures of substances or materials of the kind which constitute the components of my improved demulsifying agent. I know of no mixture, however, in which such substances or materials have been combined in molecular proportions as herein described, to produce a demulsifying agent or treating agent for resolving oil-in-water emulsions. I have found that when a mixture, in molecular proportions, of materials or substances of the kind above described is precipitated in its entirety in water-softening reactions, that one obtains an action of the kind which would ordinarily be obtained from a chemical combination, as differentiated from a mechanical mixture. I recognize, of course, that when a described mixture of such specified substances, materials or classes of components, is prepared in molecular proportion, that said mixture remains as such, that is, a physical combination, and that it is not converted into a chemical compound. If the mixture were converted into a chemical compound, then it would presumably constitute a new composition of matter, and as such, the application of this hypothetical new composition of matter for utilitarian purposes, such as the treatment of petroleum emulsions, would be new and novel and clearly distinguished from the known state of the art.

I have discovered, however, that molecular mixtures of substances, materials or compounds of the kind above described, when used as a treating agent or demulsifying agent for crude oil emulsions, ultimately act in the same manner as if the mechanical mixture had actually changed into a chemical compound. Barnickel, in U. S. Patent No. 1,223,659, dated April 24, 1917, disclosed the use of water-softening reagents for breaking oil field emulsions. For the present purpose, it is not necessary to inquire how water-softening reactions break an emulsion, because it is well known that under certain recognized conditions, the occurrence of water-softening reaction or the presence of reagents capable of water-softening, results in the resolution of the water-in-oil emulsions of the same kind as occur in oil fields. In U. S. Patent No. 1,894,759, dated January 17, 1933, to DeGroote and Wirtel, there is disclosed a mixture of a sodium acid salt and the neutral sodium salt derived from oleic acid hydrogen hydrogen sulfate, that is valuable for recovering oil from subterranean oil sands, even in the presence of soluble calcium or magnesium salts, because the described salts do not precipitate in the presence of soluble calcium salts or soluble magnesium salts. If this combination of acid sodium and neutral sodium salts is mixed with ammonium oleate in molecular proportions, and if the water solution of the ultimate mixture is contacted with either water-soluble calcium salts or water-soluble magnesium salts, or both, precipitation takes place. If the precipitate is filtered off, one would expect the filtrate to contain acid sodium and the neutral sodium salts of oleic acid hydrogen hydrogen sulfate. The filtrate does not contain any appreciable amount of salts of oleic acid hydrogen hydrogen sulfate, because, although such sulfates are not precipitated alone, they do precipitate in presence of ammonium oleate, and just as if chemical combination had taken place in the mechanical mixture prior to precipitation. The ultimate mixture is precipitated in its entirety.

The simultaneous precipitation of these two different materials is explainable either on the basis of adsorption, that is, the precipitated calcium oleate had adsorbed and carried down all the ordinarily soluble sodium salts of oleic acid hydrogen hydrogen sulfate, or else one must assume that a double calcium salt was formed, which may be represented in a general manner by the following formula:

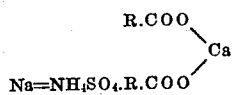

This peculiar action, to wit, simultaneous precipitation of a sulfo organic salt which ordinarily does not precipitate in the presence of calcium or magnesium salts, represents a mixture of unlooked for and unusual properties, and of unusually effective value for demulsification of oil field emulsions. Furthermore, if there is any marked variation from molecular proportions, the unusual and especially valuable properties of the mixture appear to vanish. Similar mixtures, in other than molecular proportions, may still be suitable for treating oil field emulsions, but the present process is concerned with the treatment of oil field emulsions by means of a reagent composed of the constituents indicated, in substantially molecular proportions.

Various other solfonates or sulfo salts which are recognized demulsifying agents, may be employed as one component of the demulsifying agent contemplated by my process, provided they do not precipitate with calcium or magnesium salts in the absence of added materials. Examples of this type include the following: Monopropyl naphthalene sulfonic acid ammonium salt, as described in U. S. Patent No. 1,944,021, dated January 16, 1934, to Walker; the sodium salt of lignin sulfonic acid, as described in U. S. Patent No. 1,766,058, dated June 24, 1930, to DeGroote and Monson; sodium salt of a sulfo derivative of lauryl alcohol, as described in U. S. Patent No. 1,938,323, dated December 5, 1933, to DeGroote, etc.

One may mix with these reagents, water-soluble demulsifying agents, which are characterized by the fact that they have water-softening properties. i. e., they will precipitate with water-soluble calcium salts or with magnesium salts. Suitable materials include petroleum sulfonates (which may even be oil-soluble in addition to being water-soluble or water-miscible) of the kind described by Rogers in U. S. Patent No. 1,299,385, dated April 1, 1919; the triethanolamine salt of oxalyl ricinoleic acid, described in the pending application of DeGroote, Adams and Keiser, Serial No. 664,210, filed April 3, 1933; the sodium salt of phthalyl ricinoleic acid, described in the same application; sodium salts of naphthenic acids; dibutylated naphthalene sulfonic acid ammonium salt, as described in U. S. Patent No. 1,897,576, dated February 14, 1933, to DeGroote, Monson and Wirtel; and water-soluble salts of various non-sulfo modified fatty acids, etc. It is understood, of course, that one need not select a single individual of each class, but instead, one may employ a mixture of each class, provided that the ultimate mixture of the two sub-mixtures is made in molecular proportion, calculated on average molecular weights. Likewise, water or any other inert solvent, such as alcohol, kerosene, solvent naphtha, benzol, pine oil, cresylic acid, etc. may be employed, but its presence ignored in calculating average molecular weights.

To prepare a treating agent or demulsifying agent of the kind contemplated by my present process, one need only proceed substantially along the following lines:

(a) Select a member, or mixture of members, from a class of sulfo compounds which are recognized demulsifying agents, and which do not precipitate in presence of alkaline earth salts;

(b) Mix therewith a molecular proportion of a recognized demulsifying agent of water-softening properties, or employ a mixture of such type instead of a single one;

(c) Test the said mixture with water-soluble calcium or water-soluble magnesium solutions, and note whether it precipitates in its entirety, and if so, then said mixture is suitable for use as the treating agent or demulsifying agent of my present process. A solvent may be added, if desired.

My preferred demulsifying agent is made by mixing the neutral sodium salts and the acid sodium salts of oleic acid hydrogen sulfate with a molecular proportion of the triethanolamine salt of dioxalyl-triricinolein. This last mentioned reagent is produced by combining two moles of oxalic acid with one mole of triricinolein (castor oil) and then neutralizing the free carboxyls of the oxalic acid residues with triethanolamine. A demulsifying agent thus prepared, may be diluted with any suitable solvent, such as water, alcohol, etc. As previously stated, in calculating molecular proportions, one must, of course, allow for inert material, such as water, which may be present, and if one is using a combination of two or more constituents of each class, then one must use the average molecular weight as the basis of calculation.

No claim is herein made for the individual constituents or components of the mixture as such, and no claim is herein made broadly for any mixture of one or more of said constituents. On the contrary, my present invention is restricted to a process wherein the demulsifying agent employed consists of mixtures of the two classes of materials or substances previously described, in substantially molecular proportions, and additionally characterized by the fact that the mixture precipitates in its entirety in presence of alkaline earth salts, such as water-soluble calcium and water-soluble magnesium salts. In these molecular proportions, as indicated, the mixture acts for the purposes of water softening, and hence, for purposes of demulsification, as if it were a chemical compound, and one obtains an unlooked for result, i. e., an unusually effective process of demulsification, by the use of this mixture of molecular proportions. My improved demulsifying agent is more effective than the individual reagents of which it is composed, and it is more effective than a mixture which is not in molecular proportions, or a mixture which does not precipitate in its entirety in presence of water-soluble calcium or magnesium salts. As previously specified, both classes of the materials constituting the components of my improved demulsifying agent shall be water-soluble. Either one or both may or may not be oil-soluble.

In practicing my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, I have found that for an average petroleum emulsion, a ratio of 1 part of treating agent to 5,000 parts of emulsion, will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a demulsifying agent consisting of a mixture, comprising (a) a water-soluble sulfo material of recognized demulsifying properties, and characterized by the fact that it does not precipitate when free from other materials, in the presence of an alkaline earth salt; and (b) a water-soluble demulsifying agent, characterized by the fact that it precipitates in presence of an alkaline earth salt, said combined mixture being characterized by the fact that it precipitates in its entirety in presence of an alkaline earth salt, and being additionally characterized by the fact that the mixture is in proportion conforming to the average molecular weight of the component or components of (a) as compared with the average molecular weight of the component or components of (b).

2. A process for breaking petroleum emulsions of the water-in-oil type, which consists in subjecting the emulsion to the action of a demulsifying agent consisting of a mixture, comprising (a) a water-soluble sulfo material, derived from alkylated aromatic sulfonic acid salts of recognized demulsifying properties, and characterized by the fact that it does not precipitate when free from other materials, in presence of an alkaline earth salt; and (b) a water-soluble demulsifying agent, characterized by the fact that it precipitates in presence of an alkaline earth salt, said combined mixture being characterized by the fact that it precipitates in its entirety in presence of an alkaline earth salt, and being additionally characterized by the fact that the mixture is in proportion conforming to the average molecular weight of the component or components of (a) as compared with the average molecular weight of the component or components of (b).

3. A process for breaking petroleum emulsions of the water-in-oil type, which consists in subjecting the emulsion to the action of a demulsifying agent consisting of a mixture, comprising (a) a water-soluble sulfo material, derived from lignin sulfonic acid salts of recognized demulsifying properties, and characterized by the fact that it does not precipitate when free from other materials, in presence of an alkaline earth salt; and (b) a water-soluble demulsifying agent, characterized by the fact that it precipitates in presence of an alkaline earth salt, said combined mixture being characterized by the fact that it precipitates in its entirety in presence of an alkaline earth salt, and being additionally characterized by the fact that the mixture is in proportion conforming to the average molecular weight of the component or components of (a) as compared with the average molecular weight of the component or components of (b).

4. A process for breaking petroleum emulsions of the water-in-oil type, which consists in subjecting the emulsion to the action of a demulsifying agent consisting of a mixture, comprising (a) a water-soluble sulfo material, derived from a fatty acid sulfo compound of recognized demulsifying properties, and characterized by the fact that it does not precipitate when free from other materials, in presence of an alkaline earth salt; and (b) a water-soluble demulsifying agent, characterized by the fact that it precipitates in presence of an alkaline earth salt, said combined mixture being characterized by the fact that it precipitates in its entirety in presence of an alkaline earth salt, and being additionally characterized by the fact that the mixture is in proportion conforming to the average molecular weight of the component or components of (a) as compared with the average molecular weight of the component or components of (b).

5. A process for breaking petroleum emulsions of the water-in-oil type, which consists in subjecting the emulsion to the action of a demulsifying agent consisting of a mixture, comprising (a) a water-soluble sulfo material, derived from a fatty acid sulfate or sulfates of recognized demulsifying properties, and characterized by the fact that it does not precipitate when free from other materials, in presence of an alkaline earth salt; and (b) a water-soluble demulsifying agent, characterized by the fact that it precipitates in presence of an alkaline earth salt, said combined mixture being characterized by the fact that it precipitates in its entirety in presence of an alkaline earth salt, and being additionally characterized by the fact that the mixture is in proportion conforming to the average molecular weight of the component or components of (a) as compared with the average molecular weight of the component or components of (b).

6. A process for breaking petroleum emulsions of the water-in-oil type, which consists in subjecting the emulsion to the action of a demulsifying agent consisting of a mixture, comprising (a) a water-soluble sulfo material, derived from an oleic acid sulfate or sulfates of recognized demulsifying properties, and characterized by the fact that it does not precipitate when free from other materials, in presence of an alkaline earth salt; and (b) a water-soluble demulsifying agent characterized by the fact that it precipitates in presence of an alkaline earth salt, said combined mixture being characterized by the fact that it precipitates in its entirety in presence of an alkaline earth salt, and being additionally characterized by the fact that the mixture is in proportion conforming to the average molecular weight of the component or components of (a) as compared with the average molecular weight of the component or components of (b).

MELVIN DE GROOTE.